(12) United States Patent
Constien (10) Patent No.: US 10,062,510 B2
(45) Date of Patent: Aug. 28, 2018

(54) CONTAINER FOR A PORTABLE, RECHARGEABLE DIRECT CURRENT STORAGE DEVICE

(71) Applicant: GREENPACK GMBH, Berlin (DE)

(72) Inventor: Hans-Peter Constien, Berlin (DE)

(73) Assignee: GreenPack Mobile Energy Solutions GmbH, Berlin (DE)

( * ) Notice: Subject to any disclaimer, the term of this patent is extended or adjusted under 35 U.S.C. 154(b) by 198 days.

(21) Appl. No.: 15/021,247

(22) PCT Filed: Sep. 11, 2014

(86) PCT No.: PCT/DE2014/100333
§ 371 (c)(1),
(2) Date: Mar. 10, 2016

(87) PCT Pub. No.: WO2015/035984
PCT Pub. Date: Mar. 19, 2015

(65) Prior Publication Data
US 2016/0225529 A1    Aug. 4, 2016

(30) Foreign Application Priority Data
Sep. 11, 2013  (DE) .......................... 10 2013 110 002

(51) Int. Cl.
*H02J 7/00* (2006.01)
*H01G 4/224* (2006.01)
(Continued)

(52) U.S. Cl.
CPC ............ *H01G 4/224* (2013.01); *H01G 4/008* (2013.01); *H01G 4/258* (2013.01); *H01M 2/1016* (2013.01); *H01M 2/1005* (2013.01)

(58) Field of Classification Search
CPC ...................................................... H01G 4/224
(Continued)

(56) References Cited

U.S. PATENT DOCUMENTS

| 3,665,285 A | 5/1972 | Mullersman et al. |
| 4,588,938 A | 5/1986 | Liautaud et al. |

(Continued)

FOREIGN PATENT DOCUMENTS

| DE | 295 15 922 U1 | 2/1996 |
| DE | 600 31 466 T2 | 8/2007 |

(Continued)

*Primary Examiner* — Suchin Parihar
(74) *Attorney, Agent, or Firm* — Christensen, Fonder, Dardi & Herbert PLLC (57) ABSTRACT

A container for a portable, rechargeable direct current storage device, having the following features: a housing with a housing underside with a housing set-down surface, a housing upper side, housing side walls and a housing interior, and also electrical anode and cathode contacts, wherein the housing underside has formed in it, on mutually opposite edges, set-back guide means, which extend in the direction of the housing upper side from a set-down plane defined by the housing set-down surface. The anode contact and the cathode contact can be arranged on the housing, in one or more of the set-back guide means, at a distance of at least five millimeters from the set-down plane, wherein that region of the respective housing side wall which is adjacent to the anode contact and the cathode contact terminates at a distance of at least five millimeters from the set-down plane.

15 Claims, 9 Drawing Sheets

(51) Int. Cl.
  *H01G 4/008* (2006.01)
  *H01G 4/258* (2006.01)
  *H01M 2/10* (2006.01)

(58) Field of Classification Search
  USPC ........................................................ 320/107
  See application file for complete search history.

(56) References Cited

U.S. PATENT DOCUMENTS

| | | | |
|---|---|---|---|
| 5,378,556 A | 1/1995 | Yung | |
| 6,346,793 B1* | 2/2002 | Shibata | H02J 7/0042 |
| | | | 320/107 |
| 6,427,070 B1* | 7/2002 | Smith | H01M 2/1022 |
| | | | 320/112 |
| 6,577,101 B1 | 6/2003 | Takeshita et al. | |
| 2005/0024021 A1* | 2/2005 | Zeiler | H02J 7/0027 |
| | | | 320/134 |
| 2006/0113956 A1* | 6/2006 | Bublitz | H02J 7/0013 |
| | | | 320/112 |
| 2008/0053716 A1 | 3/2008 | Scheucher | |
| 2015/0228941 A1 | 8/2015 | Enari et al. | |
| 2016/0197427 A1* | 7/2016 | Zeng | H01R 13/2407 |
| | | | 439/627 |
| 2017/0117531 A1 | 4/2017 | Takeshita et al. | |

FOREIGN PATENT DOCUMENTS

| | | |
|---|---|---|
| DE | 10 2010 048 756 A1 | 4/2012 |
| EP | 1 030 385 B1 | 10/2006 |
| JP | 2006-066289 A | 3/2006 |
| JP | 2007-005329 A | 1/2007 |
| JP | 2008-257877 A | 10/2008 |
| JP | 2015-195226 A | 11/2015 |
| KR | 10-0708219 B1 | 4/2007 |

* cited by examiner

CONTAINER FOR A PORTABLE, RECHARGEABLE DIRECT CURRENT STORAGE DEVICE

RELATED APPLICATIONS

The present application is a National Phase entry of PCT Application No. PCT/DE2014/100333, filed Sep. 11, 2014, which claims priority to German Patent Application No. 10 2013 110 002.3, filed Sep. 11, 2013, the disclosures of which are hereby incorporated by reference herein in their entirety.

FIELD OF THE INVENTION

The invention relates to a container for a hand-portable, rechargeable direct current storage device. The invention also relates to a container of this type in combination with a connecting device for the fitting of the container to the connecting device.

BACKGROUND OF THE INVENTION

A container of this type with the following characteristics is known, for example, from US 2008/0053716 A1. A housing provided with a housing underside with a housing set-down surface, a housing upper side, housing side walls and a housing interior, an electrical anode contact and an electrical cathode contact, wherein the housing underside has configured within it, on mutually opposite edges, set-back guide means which extend in the direction of the housing upper side from a set-down plane defined by the housing set-down surface. The anode contact and the cathode contact of the container are arranged a few millimeters within the set-back guide means.

The housing set-down surface is defined by those areas of the housing underside which, upon the setting down of the container upon a plane surface, are in mechanical contact with said plane surface. In the simplest full-plane arrangement, the housing set-down surface is formed by the entire housing underside.

For example, upon the setting down of this container, upon a soiled, sandy or wet surface, there is a risk of damage to and/or the soiling of the electrode contacts, to the extent that there may be a risk of the formation of a short-circuit on the direct current storage device housed in the container.

From DE102010048756A1, U.S. Pat. No. 4,588,938A and U.S. Pat. No. 3,665,285A, containers are also known for a hand-portable, rechargeable direct current storage device. These containers are provided with a housing set-down surface which defines a set-down plane. Each container is provided with an electrical anode contact and an electrical cathode contact. These contacts are arranged in recesses, which are essentially positioned centrally in the housing set-down surfaces.

SUMMARY OF THE INVENTION

The object of the present invention is the proposal of an improved container, the electrode contacts of which are more effectively protected, even under unfavourable ambient conditions.

This object is fulfilled by a container having the characteristics described in claim 1.

According to the invention, it is provided that the anode contact and the cathode contact, in one or more of the set-back guides or set back means, are arranged on the housing at a distance of at least five millimeters from the set-down plane, whereby that region of the respective housing side wall which is adjacent to the anode contact and the cathode contact terminates at a distance of at least five millimeters from the set-down plane. A clearance in excess of 8 millimeters is preferred, and a clearance in excess of 10 millimeters is particularly preferred. The anode contact and the cathode contact may either be oriented in the direction of the housing underside or in the direction of the housing side walls.

This structural arrangement of the set-back guide means not only removes the electrode contacts from the consistently fouled and/or moisture-bearing set-down plane, but also prevents the penetration of dust, sludge or snow through openings in the housing underside which, from the set-down plane, are provided for the purposes of access to the electrode contacts. In place of openings, which are easily susceptible to total or partial obstruction, the housing underside, considered from the housing set-down surface, is provided with a stepped surface profile section, at least at the periphery of the housing. This stepped surface profile section which, accordingly, is removed from the set-down plane, is not limited laterally by housing side wall segments. Accordingly, even where the container is set down on sludge, any dirt which penetrates to those regions of the housing underside which are recessed in this stepped arrangement will not achieve any lateral purchase. In this way, the adhesion of dirt is inhibited, or prevented altogether. Even in the event of the adhesion of dirt to those regions of the housing underside which are recessed in this stepped arrangement, any soiling can easily be removed, as lateral access is ensured by the likewise upwardly recessed housing side walls.

The outer profile of the housing is preferably configured as a cuboid. This geometry is formed by at least the housing underside, in combination with four housing side walls. As a departure from this cuboid shape, the housing upper side may be arched outwards or kinked.

For the reasons described above, it is particularly advantageous if the housing understide, in the region between the set-back guide means configured on the opposite edges of the housing, is at a distance of greater than 5 millimeters from the set-down plane. A clearance in excess of 8 millimeters is specifically preferred, and a clearance in excess of 10 millimeters is even more specifically preferred. The recessed and stepped region extends over the full width of the housing underside.

The set-back guide means are preferably provided with centering section, which are arranged adjacently to the anode contact and/or to the cathode contact. These central cut-outs permit the insertion of correspondingly inverse-profiled centering projections on a connecting device. This arrangement permits defined positioning between the connecting device and the container, such that secure and defined electrical contact can be established between the electrode contacts on the container and even relatively filamentary and slender electrode contact devices on the connecting device. Preferably, both the anode contact and the cathode contact are surrounded by central projections on two sides. By this arrangement, any misalignment between the container and its associated connecting device can be reliably prevented. In the interests of exceptionally easy handling, it is advantageous that the set-back guide means should be arranged below the center of gravity of the container, with the direct current storage devices fitted.

Moreover, the central cut-outs in the container are preferably configured such that, in a view of the housing underside, the central cut-outs arranged adjacently to the anode contact show a different cross-sectional profile to the central cut-outs arranged adjacently to the cathode contact. By this arrangement, any reverse-polarity bonding of the anode contact and the cathode contact with the associated connecting device can be easily and reliably prevented.

In the interests of a particularly straightforward and secure bonding of the container and the connecting device, it is advantageously provided that the central cut-outs extend at least partially beyond the anode contact and/or the cathode contact in the direction of the housing upper side. Accordingly, the central cut-outs extend in the direction of the housing upper side to a greater depth than the stepped and recessed regions of the housing underside. Upon the fitting of the housing to an associated connecting device, guide lugs with a corresponding inverse configuration to the central cut-outs engage with said central cut-outs in the area of the opposite edges of the housing. In their direction of extension, in combination with the central cut-outs, the guide lugs execute a positive-action function for the bonding of the housing and the connecting device.

In all the variants of the container described above, it is advantageous that the set-back guide means are configured, at least partially, as recesses in the housing side walls. By this arrangement, the associated connecting device can be configured such that, with the housing and the connecting device in the connected state, the latter occupies the recesses in the housing side walls, in the plane surface of said housing side walls. By this arrangement, it is possible for a plurality of housings of this type and their associated connecting devices to be arranged with the housing side walls of said housings flush-fitted next to one another, thereby saving a substantial amount of space.

In all the forms of embodiment described above, it is advantageous that the anode contact and the cathode contact are arranged in mutually opposing set-back guide means which are positioned opposite each other. In this way, conduction path the for any leakage currents via the surface profile section of the housing underside is maximized.

A preferred variant of the container is characterized in that the housing underside is provided with an anode opening and a cathode opening whereby, from the anode opening through to the anode contact, a section of one of the set-back guide means is configured as an anode guide channel with an anode guide channel recess, and from the cathode opening through to the cathode contact, a section of one of the set-back guide means is configured as a cathode guide channel with a cathode guide channel recess.

In addition to the stepped and recessed regions, these regions of the housing underside are also provided with openings, via which the electrode contacts, which are further spaced from the openings, can be accessed by means of guide channels. This structure delivers a further improvement in protection against unwanted fouling or the short-circuiting of the anode contact and the cathode contact.

It is specifically preferred that guide channels of this type are configured such that the anode guide channel and/or the cathode guide channel extend adjacently to one of the four housing side walls extend along the housing side walls. In this form of embodiment, the housing side walls provide lateral protection for the electrode contacts.

In the form of embodiment incorporating guide channels, it is also advantageous that the anode contact and the cathode contact are arranged inside the respective guide channel and/or on the housing side walls, such that there is a maximum clearance between the anode contact and the cathode contact. By this arrangement, any unwanted influence associated with leakage currents between the electrodes is minimized.

It is also advantageous that the anode opening and the cathode opening of the respective guide channels are configured with different opening profiles. The guide channels then assume the above-described function of the central cut-outs.

It is also advantageous that the anode guide channel and/or the cathode guide channel are hermetically sealed in relation to the housing interior. By this arrangement, even where the housing is set down in water, the upsurge of water via the guide channels to the electrode contacts and the short-circuiting thereof can be prevented.

In all the forms of embodiment of the container described above, it is advantageous that the anode contact and/or the cathode contact are covered by mechanically pivoting cover devices. Upon the fitting of the housing to the connecting device, these cover devices are moved clear, for example, by the inherent weight of the housing. In the case of compressable media such as sludge or snow, the force exerted by sludge or snow upon the setting down of the housing will not be sufficient to move the cover devices. Alternatively, a mechanism may be provided by means of which, for example, a specifically designed structure provided on the connecting device actuates the release and the opening of the cover device upon the fitting of the housing to the connecting device. This arrangement provides additional protection for the electrode contacts.

In all the forms of embodiment described above, it is also advantageous that, adjacently to the set-back guide means and/or within the set-back guide means, air-conditioning interfaces are provided for the air-conditioning of the housing interior. Upon the fitting of the housing to the connecting device, a coupling process then proceeds for electrical bonding and a connection of the housing to an associated air-conditioning device.

In all the variants of the housing with the set-back guide means described above, the system is configured as an appropriately designed connecting device for the electrical bonding of the anode contact and the cathode contact of the container upon the fitting of the container to the connecting device.

BRIEF DESCRIPTION OF THE DRAWINGS

For exemplary purposes only, various forms of embodiment of the housing and appropriate connecting devices are described below with reference to the figures.

These represent the following.

DETAILED DESCRIPTION

Figure 1:
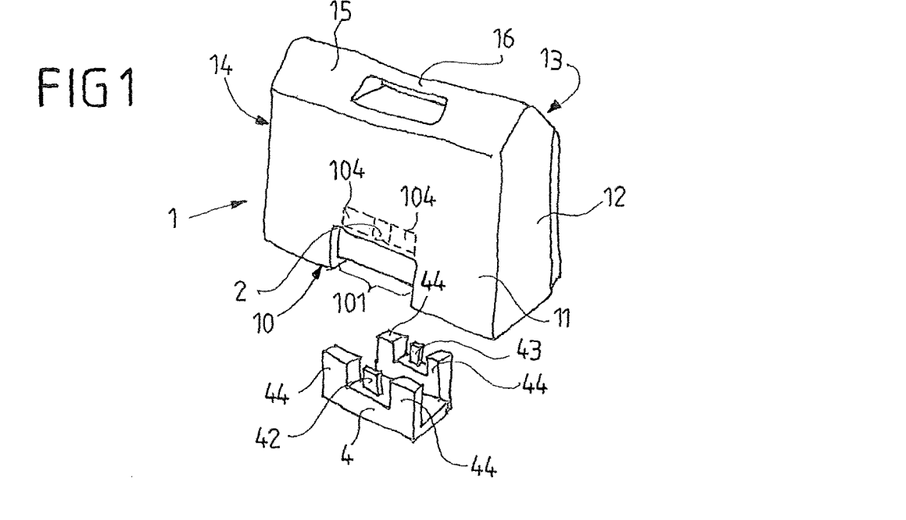
FIG. 1 shows a schematic perspective view of a first form of embodiment of a housing 1 with an associated connecting device 4.

FIG. 1 shows a schematic perspective view of a first form of embodiment of a housing 1 for a hand-portable, rechargeable direct current storage device with an associated connecting device 4. The outer profile of the housing 1 is essentially configured as a cuboid with a housing upper side 15, four housing side walls 11, 12, 13, 14 and a housing underside 10. As a departure from the strictly cuboid form, the housing upper side 15 is configured with a slight upward arch, and incorporates a centrally arranged handle 16. Below the handle 16, in the region of the housing underside 10, the frontal set-back guide or guide means 101 can be seen. The latter is specifically configured as a recess in the frontal housing side wall 11. This means that, in the region of the set-back guide means 101, the housing side wall 11 does not extend downwards to the same depth as in the neighbouring regions. The rear edge of the housing underside 10 opposite the set-back guide means 101 incorporates a similarly configured further set-back guide or guide means 102, which is not represented here. In the region of the frontal set-back guide means 101, an anode contact 2 is arranged behind the housing side wall 11. The anode contact 2 is surrounded on both sides by central cut-outs 104. The latter are also covered and laterally protected by the housing side wall 11. Both the anode contact 2 and the central cut-outs 104 on either side can only be accessed from below via the set-back guide means 101. By means of the further set-back guide means 102, which is not shown in this representation, a cathode contact 3, which is also surrounded on both sides by central cut-outs 104, can be accessed from below.

A connecting device 4 is represented below the housing 1. The connecting device 4 is provided with an anode contact connector 42, which is surrounded on either side by two guide lugs 44. The guide lugs 44 of the anode contact connector 42 are spaced such that, upon the fitting of the housing 1 to the connecting device 4, they engage with the two central cut-outs 104 of the anode contact 2. Matching the clearance between the anode contact 2 and the—in this case unrepresented—cathode contact 3 in the housing 1, a cathode contact connector 43 is provided on the connecting device 4, further to the anode contact connector 42. The cathode contact connector 43 is likewise surrounded on either side by two guide lugs 44. Upon the fitting of the housing 1 to the connecting device 4, all four guide lugs 44 engage with corresponding central cut-outs 104 in the housing. This ensures the secure and definedly effected electrical bonding of the connecting device 4 and the housing 1.

Figure 2:
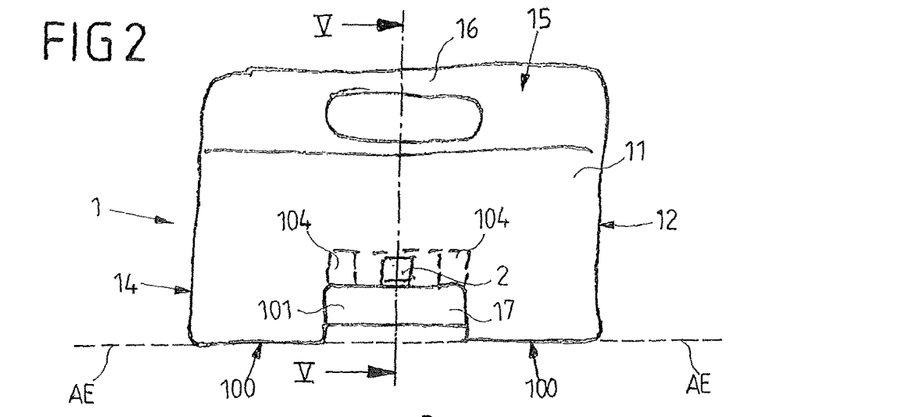
FIG. 2 shows a side view of the housing 1 from FIG. 1.
Figure 3:
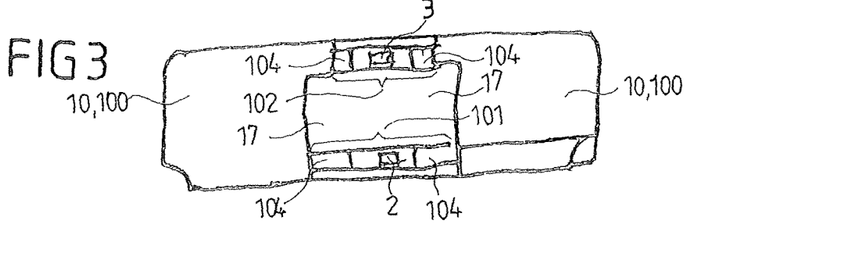
FIG. 3 shows a view of the housing underside 10 of the housing 1 from FIG. 1.

FIG. 2 shows a side view of the housing 1 represented in FIG. 1. Equivalent components are represented by the same reference numbers. It will be seen that, to the left and right of the set-back guide means 101, the housing underside 10 forms two housing set-down surfaces 100. On these housing set-down surfaces 100, the housing 1 is arranged on a set-down plane AE. In the region of the anode contact 2 and the surrounding central cut-outs 104, the frontal set-back guide means 101 has a housing side wall 11 which runs upwards and backwards considered from the set-down plane AE. Considered from the rear, the set-back guide means 101 runs back down in the direction of the set-down plane AE, but does not reach the latter. Shortly before reaching the set-down plane AE, the outline of the housing underside 10 formed in this region of the set-back guide means 101 kinks away to the rear, running parallel to the set-down plane AE, and encloses a cable compartment 17 in the housing 1. FIG. 3 shows a view of the housing underside 10 of the housing 1 represented in FIGS. 1 and 2. In this case, the two set-back guide means 101, 102 can be seen on the opposite edges of the housing underside 10. The two set-back guide means 101, 102 interlock with each other. Clearance between the complete region between the two edges and the set-down plane AE is maintained by the interlocking set-back guide means 101, 102. If the housing underside 10 of a housing 1 of this type is set down on snow or sludge, the snow or sludge will initially be brought into contact with the housing set-down surfaces 100, and thereafter with the underside of the cable compartment 17. Snow or sludge cannot penetrate through to the uppermost regions of the set-back guide means 101, 102 with the anode contact 2 and the cathode contact 3.

Figure 4:
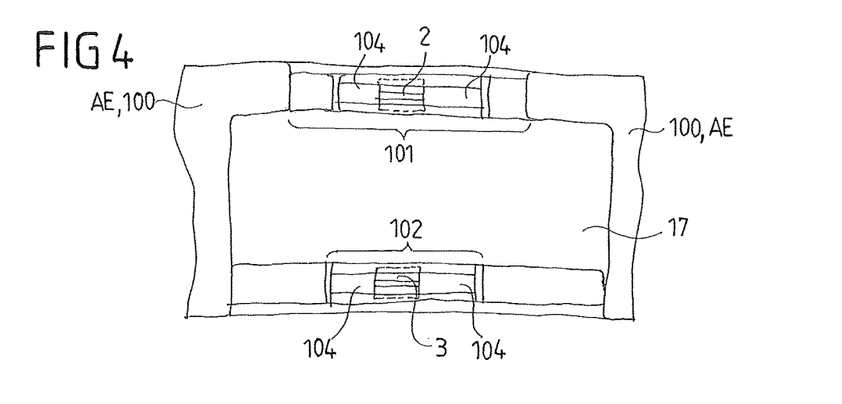
FIG. 4 shows an enlarged partial cross-section of the view of the housing underside 10 shown in FIG. 3.

FIG. 4 shows an enlarged partial cross-section of the view of the housing underside 10 shown in FIG. 3.

Figure 5:
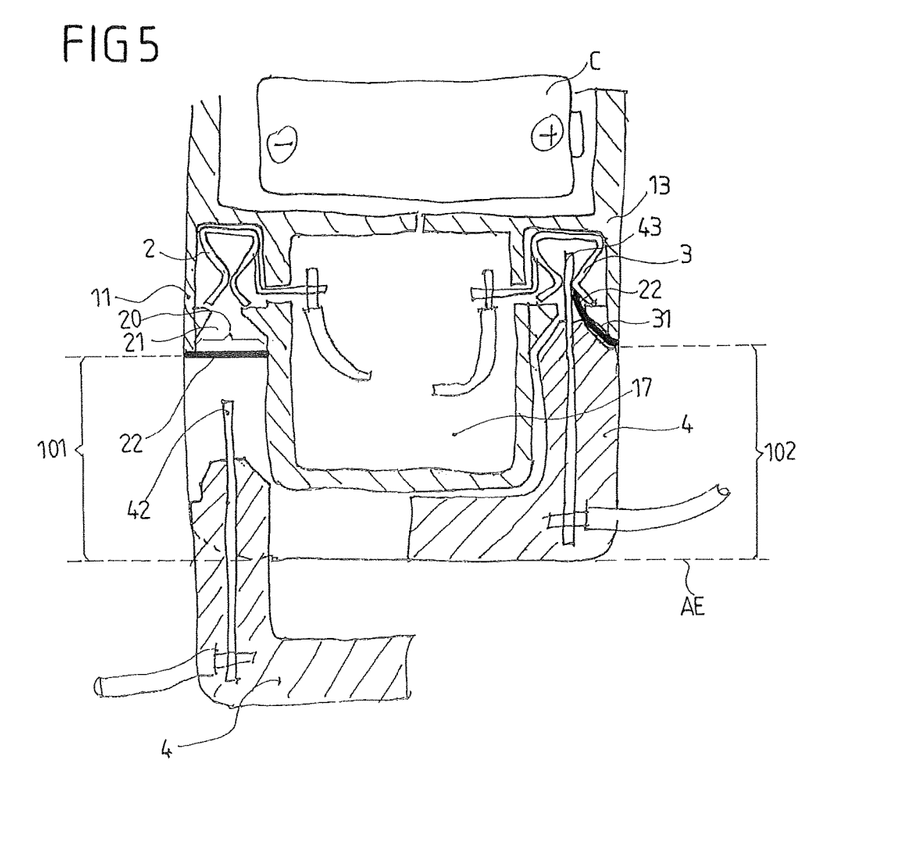
FIG. 5 shows a cross-sectional view at line V-V in FIG. 2, wherein elements of a connecting device 4 are also represented.

FIG. 5 shows a cross-sectional view at line V-V in FIG. 2, wherein elements of a connecting device 4 are also represented. Here again, equivalent components are represented by the same reference numbers. In this representation, the anode opening 20 can be seen on the left, with the anode opening channel 21 arranged thereupon, extending from the anode opening 20 to the anode contact 2. The housing side wall 11 provides lateral protection for the anode contact 2 against environmental influences. The anode opening 20 is closed by a cover device 22. This may be, for example, a flap of an elastically deformable material. Upon the fitting of the housing 1 to the connecting device 4, this flap is bent to the side by the anode contact connector 42 and the cathode contact connector 43, thereby permitting the contact connectors 42, 43 to engage with the associated contacts 2, 3. The bent position of the cover device 22 in relation to the cathode opening 30 is represented on the right-hand side. An energy storage cell C is represented, in a purely schematic form. This may be configured as a rechargeable direct current storage device, in the form of all types of electrochemical secondary cells used as capacitors.

Figure 6:
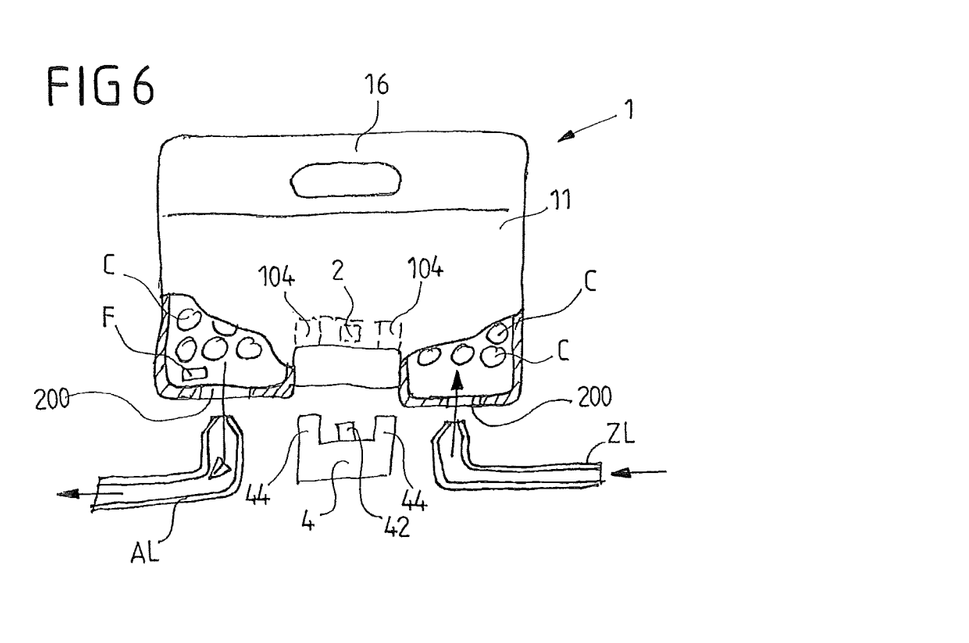
FIG. 6 shows a side view of a second form of embodiment of the housing 1, with interfaces for the air-conditioning of the housing interior.

FIG. 6 shows a side view of a second form of embodiment of the housing 1, with interfaces 200 for the air-conditioning of the housing interior. In comparison with the first form of embodiment, equivalent components are represented by the same reference numbers. Accordingly, the embodiments described above will apply correspondingly. In order to avoid repetitions, the differences will primarily be described hereinafter. Adjacently to the frontal set-back guide means 101, an air-conditioning interface 200, configured as an opening, is arranged in each case in the housing underside 10. The interior of the housing 1 can be seen through a partially cut-away housing side wall 11. A plurality of mutually spaced and electrically interconnected energy storage cells C is arranged herein. Where the housing 1 is fitted to the connecting device 4, simultaneously with the electrical coupling of the housing 1, the housing interior is coupled to an air intake line ZL and an exhaust air line AL. By this arrangement, the housing interior can be maintained at a desired working temperature. A fire-extinguishing device F may be arranged in the housing interior. Specifically in the case of state-of-the-art lithium-ion accumulators, in the event of defective control during charging and discharging, high temperatures may occur to the extent that there is an acute risk of fire.

Figure 7:
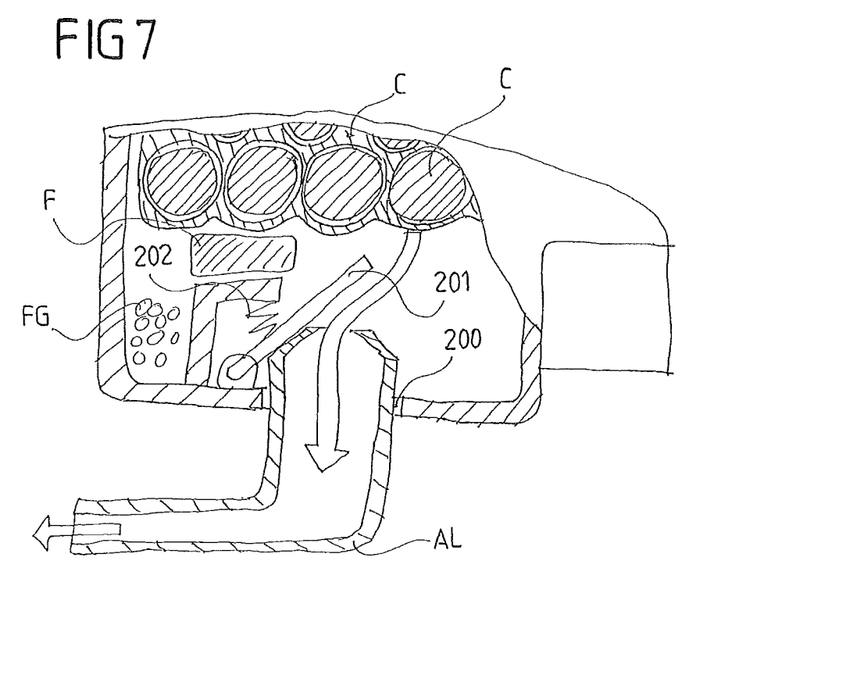
FIG. 7 shows an enlarged partial cross-section of FIG. 6.

FIG. 7 shows an enlarged partial cross-section of FIG. 6 wherein, as distinct from FIG. 6, a cover flap 201 is represented, which is arranged to pivot on the housing 1 in the region of the air-conditioning interface 200. In the closed state, the cover flap 201 covers the air-conditioning interface 200. The pivoting mechanism is spring-loaded by a spring 202 such that, when the housing 1 is fitted to the exhaust air line AL which is represented in this case, the cover flap 201 pivots into the housing interior, against the force of the spring 202. When the housing 1 is removed, the spring 202 pushes the cover flap 201 back over the air-conditioning interface 200. In addition to the fire-extinguishing device F, a fire-extinguishing granulate FG may additionally be arranged in the interior of the housing 1.

Figure 8:
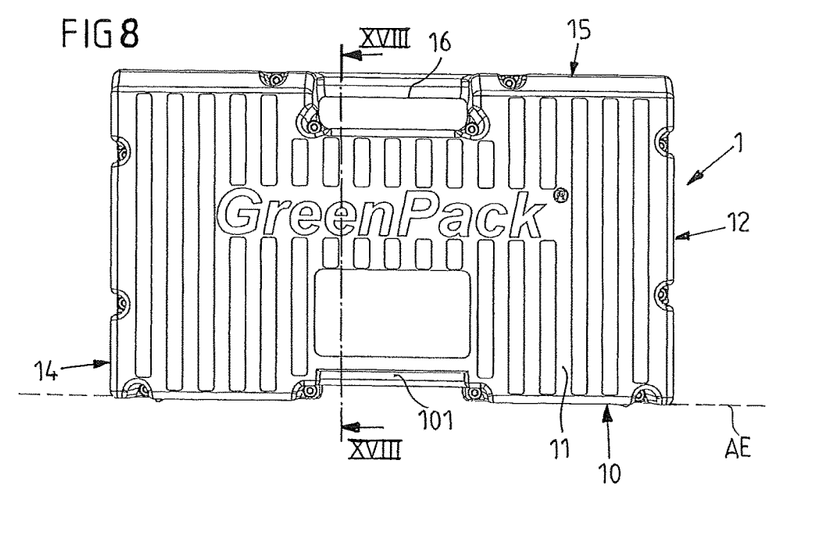
FIG. 8 shows a side view of a third form of embodiment of a housing 1, with no associated connecting device.
Figure 9:
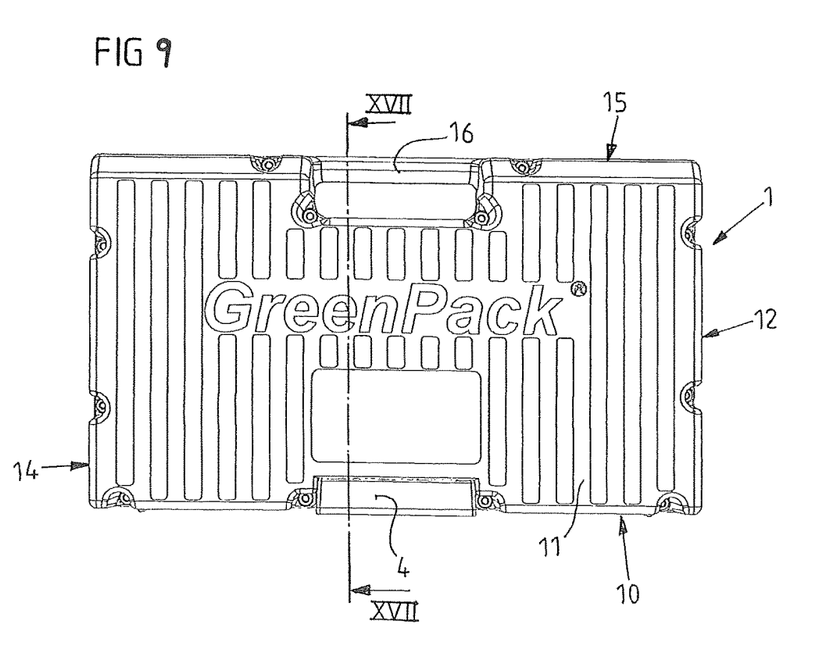
FIG. 9 shows the view of the housing 1 shown in FIG. 8, fitted to an appropriate connecting device 4.
Figure 10:
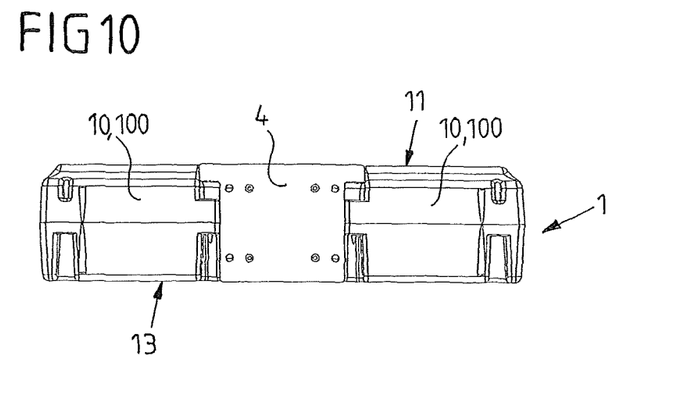
FIG. 10 shows a view of the housing underside 10 of the housing 1 from FIG. 9.
Figure 11:
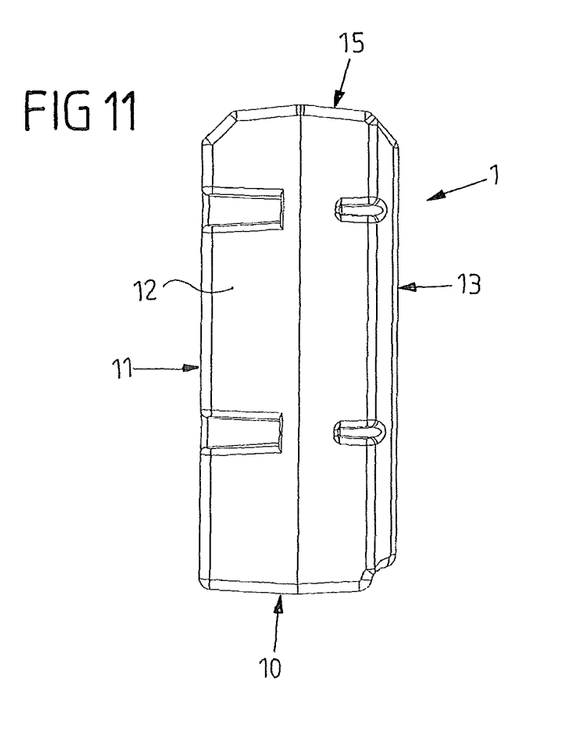
FIG. 11 shows a side view of the housing 1 from FIG. 8.

FIG. 8 shows a side view of a third form of embodiment of a housing 1, with no associated connecting device. In comparison with the first form of embodiment, equivalent components are represented by the same reference numbers. Accordingly, the embodiments described above will apply correspondingly. In order to avoid repetitions, the differences will primarily be described hereinafter. In this form of embodiment, the housing 1, with its housing underside 10, four housing side walls 11, 12, 13, 14 and the housing upper side 15 is essentially configured as a cuboid. FIG. 9 shows the view of the housing 1 represented in FIG. 8, with the latter fitted to an appropriate connecting device 4. FIG. 10 shows a view of the housing underside 10 of said housing 1. The connecting device 4 is configured such that the outer edge thereof, upon the fitting of the housing 1 with its set-back guide means 101, 102 to the connecting device 4, terminates flush with the housing underside 10, and the frontal housing side wall 11 and the rear housing side wall 13. This configuration also proceeds from FIG. 11, which represents a side view of the housing 1.

Figure 12:
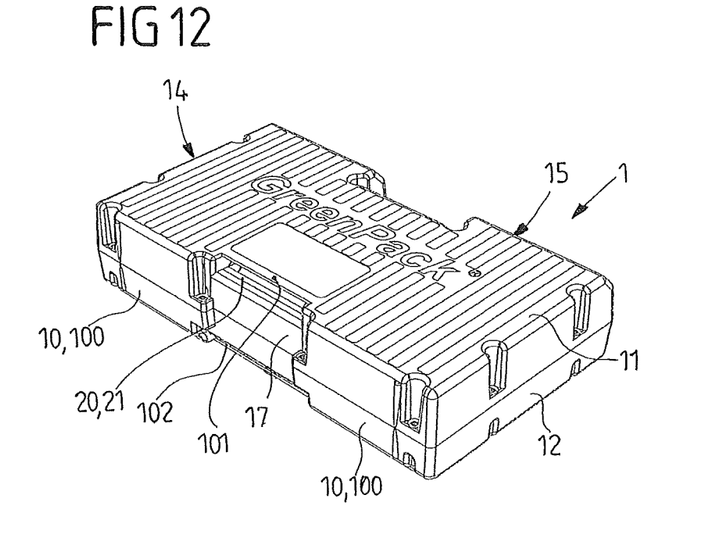
FIG. 12 shows a perspective view of the housing 1 from FIG. 8.
Figure 13:
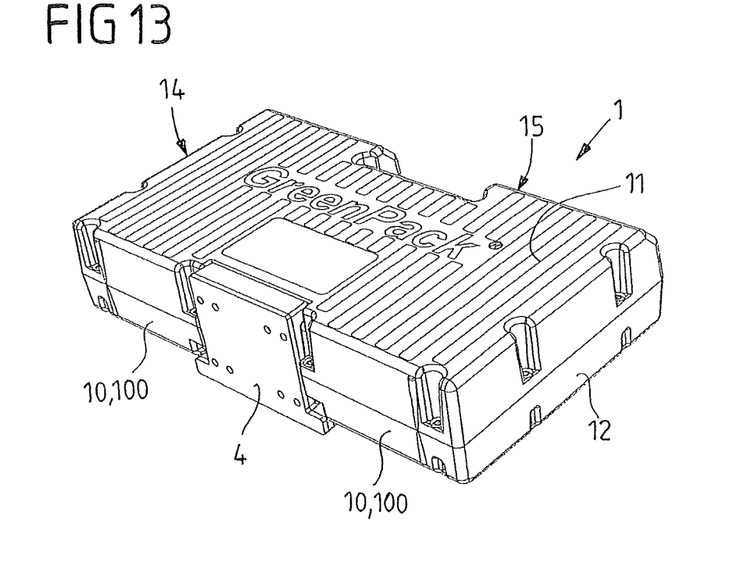
FIG. 13 shows a perspective view of the housing 1 from FIG. 9.

FIG. 12 shows a perspective view of the housing 1 represented in FIG. 8, with no connecting device 4 fitted, and FIG. 13 shows the same perspective view, with a connecting device 4 fitted.

Figure 14:
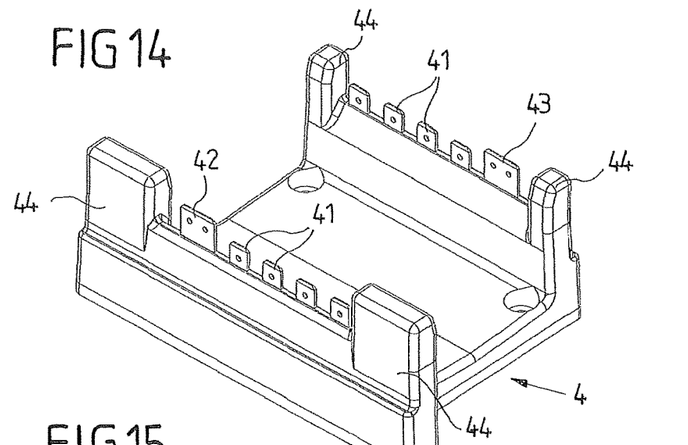
FIG. 14 shows a perspective view of the connecting device 4 for the third form of embodiment of the housing 1.

FIG. 14 shows a perspective view of the connecting device 4 for the third form of embodiment of the housing 1. In addition to the anode contact connector 42 and the cathode contact connector 43, the connecting device is also provided with a plurality of data contact connectors 41. Four data contact connectors 41 respectively are arranged adjacently to the anode contact connector 42 and to the cathode contact connector 43. The anode contact connector 42 and the cathode contact connector 43 are arranged with the maximum possible diagonal spacing, such that the leakage current path is correspondingly large.

Figure 15:
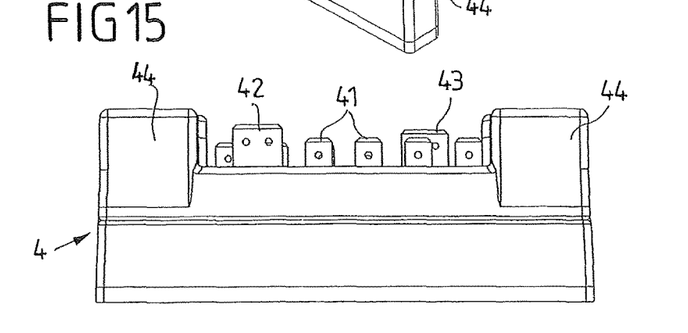
FIG. 15 shows a view of the front side of the connecting device 4 from FIG. 14.
Figure 16:
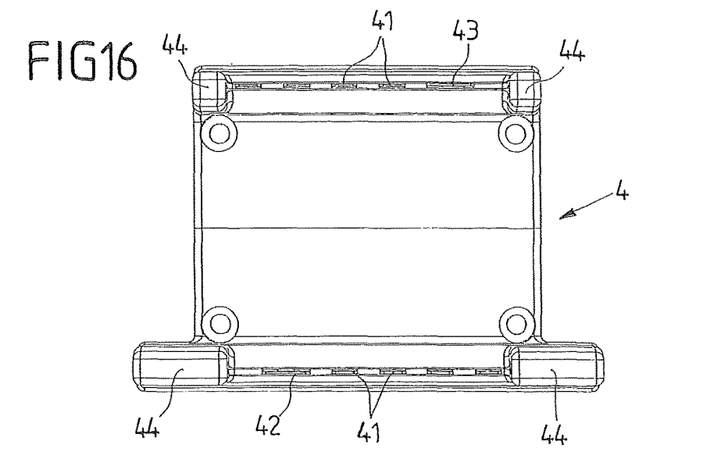
FIG. 16 shows a view of the upper side of the connecting device 4 from FIG. 14.

From FIG. 15, which shows a view of the front side of the connecting device 4, it will be seen that the guide lugs 44 project slightly above the contact connectors 41, 42, 43. This ensures that, upon the fitting of the housing 1 to the connecting device 4, the initially applied mechanical contact between the guide lugs 44 and the central cut-outs 104 assigned by way of the appropriate cross-sectional surface establishes the correct position of the housing 1 in relation to the connecting device 4, for the purposes of electrical bonding. Thereafter, from this position, the housing 1 and the connecting device 4 move together along the direction of extension of the guide lugs 44, such that the contact connectors 41, 42, 43 engage with the associated electrical contacts 2, 3, 414 in the housing 1. FIG. 16 shows a view of the upper side of the connecting device 4. It will be seen here that the contact connectors 41, 42, 43 are configured as knife-blade contacts.

Figure 17:
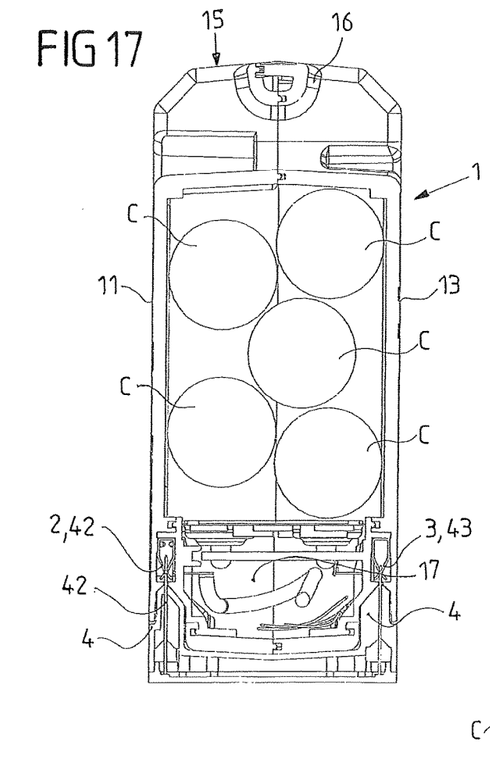
FIG. 17 shows a cross-sectional view at line XVII-XVII in FIG. 9.
Figure 18:
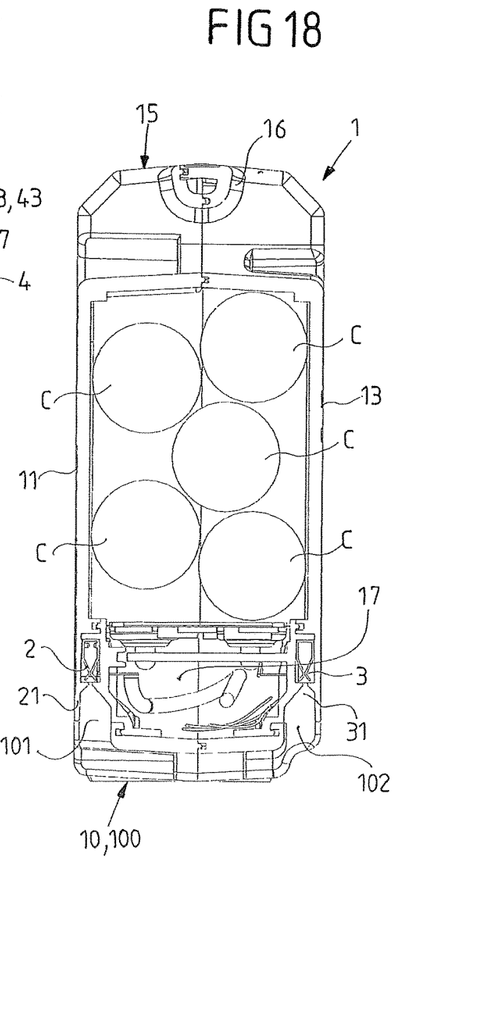
FIG. 18 shows a cross-sectional view at line XVIII-XVIII in FIG. 8.

FIG. 17 shows a cross-sectional view at line XVII-XVII in FIG. 9, and FIG. 18 shows a cross-sectional view at line XVIII-XVIII in FIG. 8.

Figure 19:
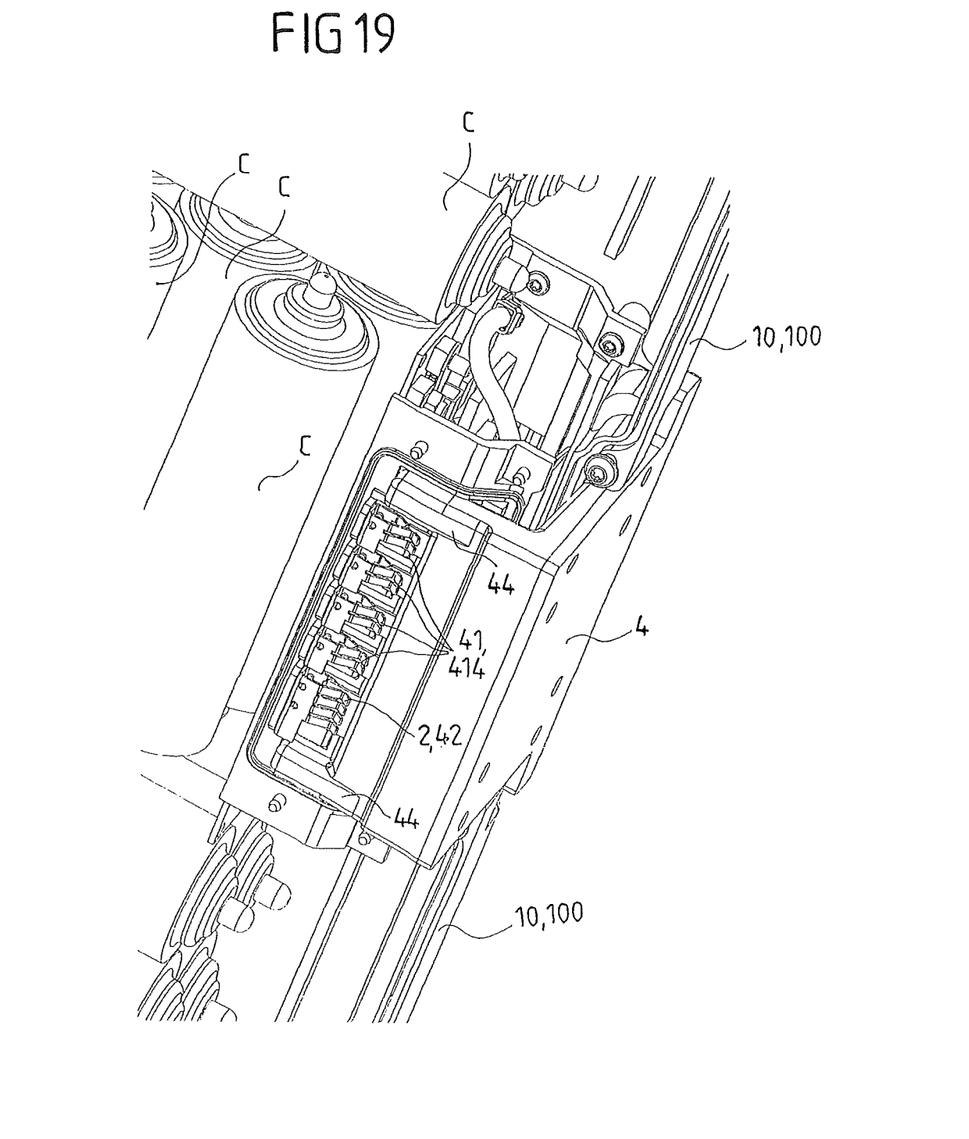
FIG. 19 shows a perspective view of an enlarged partial view of the housing 1 with the connecting device 4 from FIG. 13, and with no housing side wall 10.

FIG. 19 shows a perspective view of an enlarged partial view of the housing 1 with the connecting device 4 represented in FIG. 13, with the housing side wall 10 omitted. As a result of the omission of the housing side wall 11 in this representation, the energy storage cells C and the bonded contact connectors 41, 42, 43 can be seen.

LIST OF REFERENCES

1 Housing
2 Anode contact
3 Cathode contact
4 Connecting device
10 Housing underside
11 Housing side wall
12 Housing side wall
13 Housing side wall
14 Housing side wall
15 Housing upper side
16 Handle
17 Cable compartment
20 Anode opening
21 Anode guide channel
22 Cover device
30 Cathode opening
31 Cathode guide channel
41 Data contact connector
42 Anode contact connector
43 Cathode contact connector
44 Guide lugs
100 Housing set-down surface
101 Set-back guide means
102 Set-back guide means
104 Central cut-outs
200 Air-conditioning interface
201 Cover flap for air-conditioning interface
202 Spring for cover flap
C Energy storage cell
F Fire extinguishing device
FG Fire extinguishing granulate
AE Set-down plane
ZL Air intake line
AL Exhaust air line

The invention claimed is:

1. A container for a hand-portable, rechargeable direct current storage device, comprising:
  a housing provided with a housing underside with a housing set-down surface, a housing upper side, housing side walls and a housing interior, an electrical anode contact and an electrical cathode contact, wherein the housing underside has configured upon it, on mutually opposite edges, set-back guides which extend in the direction of the housing upper side from a set-down plane defined by the housing set-down surface, wherein the anode contact and the cathode contact in one or more of the set-back guides are arranged on the housing at a distance of at least five millimeters from the set-down plane, whereby that region of the respective housing side wall which is adjacent to the anode contact and the cathode contact terminates at a distance of at least five millimeters from the set-down plane, wherein the housing underside, considered from the housing set-down surface, is provided with a stepped surface profile section, at least at the periphery of the housing, whereby said stepped surface profile section which, accordingly, is removed from the set-down plane, is not limited laterally by housing side wall segments such that, even when the container is set down on sludge, adhesion of dirt which penetrates to those regions of the housing underside which are recessed in this stepped arrangement is inhibited.

2. The container as claimed in claim 1, wherein the housing underside, in the region between the set-back guides configured on the opposite edges of the housing, terminates at a distance of at least five millimeters from the set-down plane.

3. The container as claimed in claim 1, wherein the set-back guides are provided with central cut-outs, which are arranged adjacently to the anode contact and/or to the cathode contact.

4. The container as claimed in claim 3, wherein in a view of the housing underside, the central cut-outs adjacently to the anode contact show a different cross-sectional profile to the central cut-outs adjacently to the cathode contact.

5. The container as claimed in claim 3, wherein the central cut-outs extend at least partially beyond the anode contact and/or the cathode contact in the direction of the housing upper side.

6. The container as claimed in claim 1, wherein the set-back guides are configured, at least partially, as recesses in the housing side walls.

7. The container as claimed in claim 1, wherein the anode contact and the cathode contact are arranged in mutually opposing set-back guides.

8. The container as claimed in claim 1, wherein the housing underside is provided with an anode opening and a cathode opening whereby, from the anode opening through to the anode contact, a section of one of the set-back guides is configured as an anode guide channel with an anode guide channel recess, and from the cathode opening through to the cathode contact, a section of one of the set-back guides is configured as a cathode guide channel with a cathode guide channel recess.

9. The container as claimed in claim 7, wherein the anode guide channel and/or the cathode guide channel are arranged adjacently to one of the four housing side walls, and extend along the housing side walls.

10. The container as claimed in claim 9, wherein the anode contact and the cathode contact are arranged inside the respective guide channel and/or on the housing side walls, such that there is a maximum clearance between the anode contact and the cathode contact.

11. The container as claimed in claim 8, wherein the anode opening and the cathode opening are configured with different opening profiles.

12. The container as claimed in claim 8, wherein the anode guide channel and/or the cathode guide channel are hermetically sealed in relation to the housing interior.

13. The container as claimed in claim 1, wherein the anode contact and/or the cathode contact are covered by mechanically pivoting cover devices.

14. The container as claimed in claim 1, wherein adjacently to the set-back guides and/or within the set-back guides, air-conditioning interfaces are provided for the air-conditioning of the housing interior.

15. The container as claimed in claim 1, further comprising a connecting device for the electrical bonding of the anode contact and the cathode contact of the container upon the fitting of the container to the connecting device.

* * * * *